Figure 1:
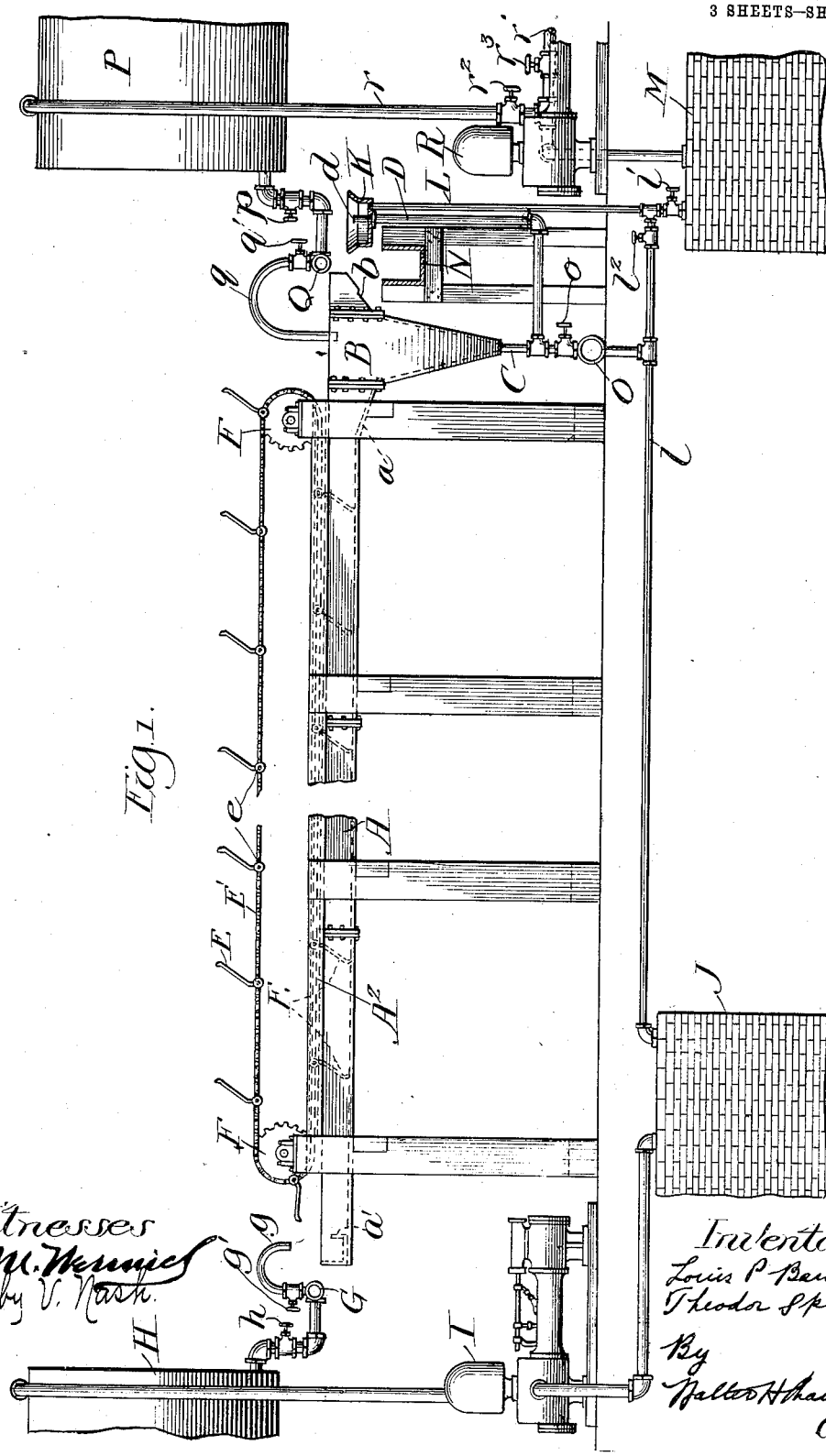

L. P. BAUER & T. SPECK.
MANUFACTURE OF STARCH.
APPLICATION FILED JAN. 17, 1908.

986,540.

Patented Mar. 14, 1911.

3 SHEETS—SHEET 1.

L. P. BAUER & T. SPECK.
MANUFACTURE OF STARCH.
APPLICATION FILED JAN. 17, 1908.

986,540.

Patented Mar. 14, 1911.

3 SHEETS—SHEET 2.

Witnesses
Inventors
Louis P. Bauer and
Theodor Speck
by
Walter H. Chamberlin
Atty

L. P. BAUER & T. SPECK.
MANUFACTURE OF STARCH.
APPLICATION FILED JAN. 17, 1908.

986,540.

Patented Mar. 14, 1911.

3 SHEETS—SHEET 3.

Witnesses:

Inventors
Louis P. Bauer and
Theodor Speck
by Walter H. Chamberlin
Atty

UNITED STATES PATENT OFFICE.

LOUIS P. BAUER AND THEODOR SPECK, OF CHICAGO, ILLINOIS; SAID SPECK ASSIGNOR TO SAID BAUER.

MANUFACTURE OF STARCH.

986,540.  Specification of Letters Patent.  Patented Mar. 14, 1911.

Application filed January 17, 1908. Serial No. 411,256.

*To all whom it may concern:*

Be it known that we, LOUIS P. BAUER and THEODOR SPECK, both citizens of the United States, residing at Chicago, county of Cook, State of Illinois, have invented a certain new and useful Improvement in the Manufacture of Starch, and declare the following to be a full, clear, and exact description of the same, such as will enable others skilled in the art to which it pertains to make and use the same, reference being had to the accompanying drawings, which form a part of this specification.

Our invention has for its object to provide a simple and novel process of separating and recovering substances which are held in suspension in a liquid medium which also contains impurities where the natures of such a substance and the impurities are such that the one or the other has a greater specific gravity or a greater capability of settling under certain conditions.

We have found that by causing a thin layer of watery raw starch to move gently over a smooth surface, or without coming into contact with obstructions, a very large per cent. of the starch in pure form will settle and, after such settling, there will be no re-mixing of the impurities with the starch if the impure water is not allowed to stand so as to permit the impurities to settle. In accordance with our invention the settled starch is controlled in such a manner that there are formed no solid masses of starch which may offer rough or uneven surfaces over which the impure watery mixture must flow. We accomplish this by gently removing the starch as fast as it settles and before it has time to become packed or caked, care being taken that there is no agitation which might again result in an admixture of the impurities with the starch. By preventing the settled starch from being again rendered impure, the presence of the usual attendant who scrapes the surface of the deposited starch is made unnecessary. By recovering the starch in liquid form, gravity does the work of the shovelers in the old process, the transportation of the starch becomes simply a matter of piping. By removing the starch as fast as it settles the process is made continuous.

We have found that the best way of recovering the precipitated starch is to maintain a deep body or mass of watery starch in the form of a comparatively dense liquid; produce and maintain a gently and slowly moving layer of the impure mixture over this body or mass; collect the starch upon this mass as it settles; withdraw starch from the bottom of said mass at a rate corresponding to that of settling; and allow the mixture, after being largely exhausted of starch, to be gently discharged at its own level at a rate sufficient to maintain the depth of the layer constant within reasonable limits. By withdrawing the starch from the bottom of a deep mass, and one which has considerable cross-sectional area, there is only a slow settling motion at the top of the mass,—where it is in contact with the moving layer,—and all danger of detrimental commotion or agitation is avoided.

Our invention may be practiced in various ways: For example, the raw mixture may be fed upon a short, smooth, rigid table so arranged that there will be an overflow when the material covers the table to a predetermined depth. A deep broad hopper filled with pure watery starch may be provided at one end of the table, and the starch, as it settles, may be gently moved and deposited in the hopper. The starch may then be withdrawn from the bottom of the hopper and the exhausted liquid be allowed to overflow at the end of the table.

The various features of novelty which characterize our invention will be hereinafter pointed out with particularity in the claims, but for a full understanding of the invention and of its various objects and advantages reference may be had to the following detailed description taken in connection with the accompanying drawings which show apparatus whereby our invention may be carried out automatically, said apparatus forming the subject of a second application filed by us concurrently herewith.

Figure 2:
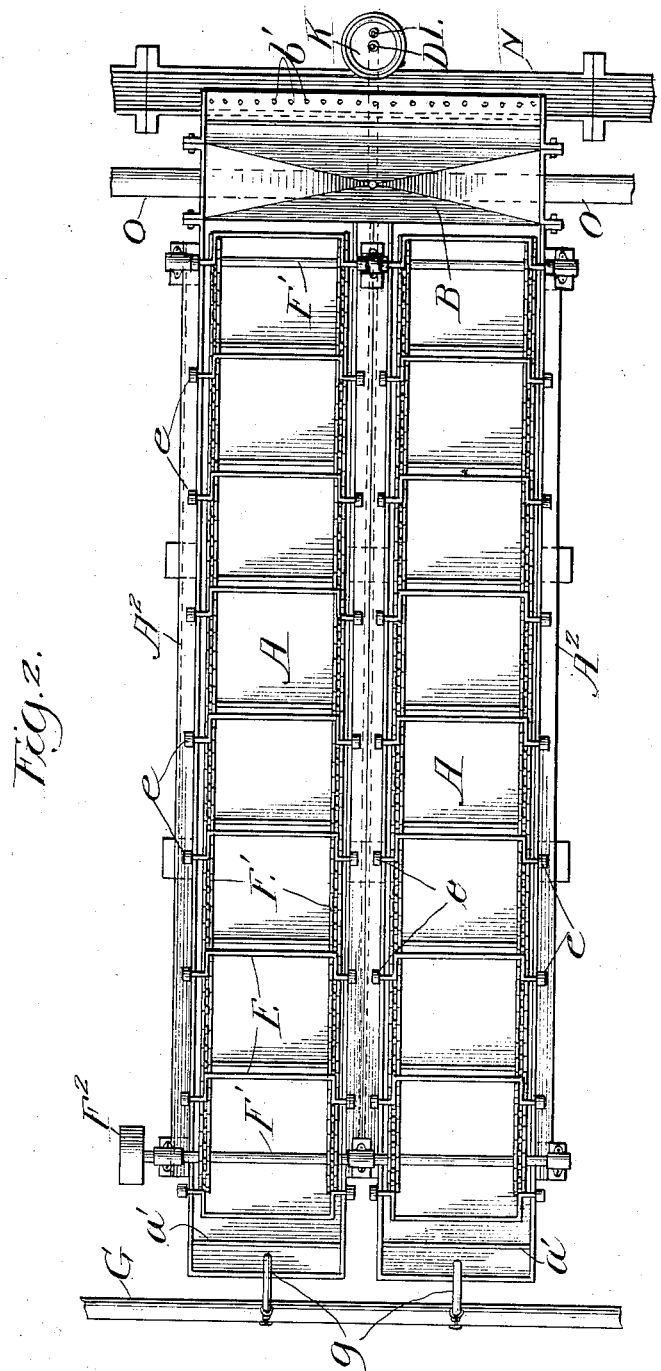
Figure 3:
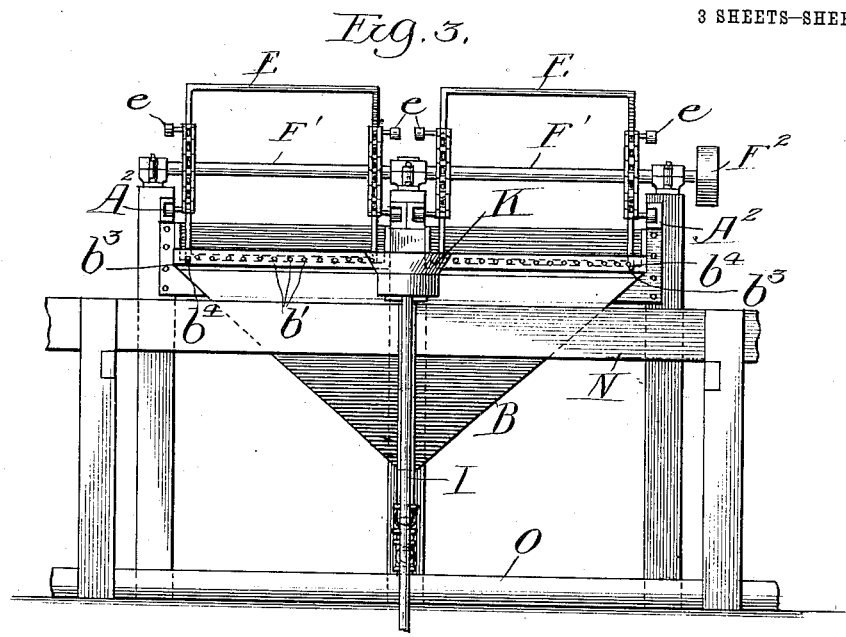
Figure 4:
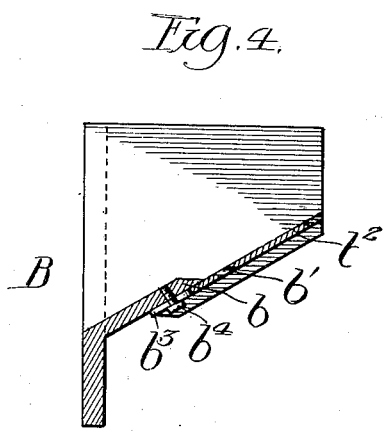

In the drawings, Figure 1 is a side elevation of a complete system containing one unit; Fig. 2 is a plan view; and Fig. 3 an end view of said unit; and Fig. 4 shows a detail.

While we are illustrating automatic apparatus for practicing our invention, it will of course be understood that such apparatus is not intended to define the bounds of our invention, but only to show a highly developed means whereby our novel method may be carried out in an advantageous and economical manner.

Referring to the drawings, A, A indicate a pair of short shallow troughs or tables inclined slightly from the rear ends to the front ends where both tables end in a single depending hopper B. The top of the tables near the hopper and the upper portion of the front wall of the hopper, as at $a$ and $b$, respectively, are sloped so as to form, in effect, a wide mouth for the hopper. Near the rear ends of the tables are transverse partitions $a'$ $a'$ of a depth somewhat less than that of the side walls of the tables; thereby forming transverse troughs across the ends of the tables. The sides of the hopper converge until they almost meet at a point considerably below the tables and an outlet C is provided at this point. From this outlet leads a pipe D which extends laterally and then upwardly to a level approximately in the plane of the tables. The top of the front wall of the hopper rises to a level somewhat above the plane of the table.

E E represent a series of paddles or scrapers, preferably U-shaped as shown, which are carried upon endless chains or the like. There is a set of these scrapers or paddles for each table and they and their supporting chains are so arranged with respect to the tables that the scrapers or paddles may be caused to move slowly across the tops of the tables from the rear end to the end at which the hopper is situated. During this passage across the tables the scrapers or paddles preferably ride directly upon the surfaces of the tables. The endless carriers for the scrapers or paddles may be supported in any suitable manner, as for example, by sprocket wheels F secured upon shafts F' mounted at opposite ends of the tables and extending transversely thereof. Motion may be imparted in any suitable manner as for example, by means of a belt pulley $F^2$ upon one of the shafts. If desired, rollers $e$ running upon stationary tracks $A^2$ may be arranged upon the traveling carriers adjacent the points of connection between the scrapers or paddles, and the traveling carriers. By providing these tracks the proper relation is at all times maintained between the tables and paddles or scrapers even though the carriers should stretch and tend to sag.

G is a header arranged adjacent the rear end of the tables and provided with a discharge pipe $g$ at each table the outlets of these pipes being directly above the transverse troughs formed by the partitions $a'$. There is a valve $g'$ in each of the pipes $g$ so that the header may be caused to discharge into any desired number of units or portions of units and be prevented from discharging into the others. While we have shown only a single unit composed of two tables it will of course be understood that enough individual tables or groups of tables arranged in the form of units will be employed to take care of the output of any particular factory. The header G may be made to extend adjacent as many of the tables as is convenient, it being of course understood that where it is not convenient to use a single header a plurality of headers will be employed. The header G is preferably supplied from a tank such as H which in turn receives its supply from a pump I or other source. The pump could be connected directly to the header but by interposing the tank or reservoir a steady pressure may be maintained within the header regardless of variation in pressure in the pipe leading from the pump. The suction end of the pump is connected to a tank or reservoir J. The tank J, in the form of our invention illustrated, may and preferably does receive the watery mixture of starch with gluten and other impurities directly after the bolting operation; for, as will hereinafter appear the usual settling tank wherein a part of the water is separated from the mixture may be entirely eliminated.

To practice our invention, the valve $g'$ in one of the pipes $g$ is opened and the watery mixture of starch with gluten and other impurities is permitted to flow upon the corresponding table. As soon as the transverse trough is full a broad thin sheet of the mixture overflows upon the table and starts on a course toward the opposite end. This steady overflow will be maintained as long as the supply lasts and therefore there will be a slow and gentle flow across the table to the hopper. As in the old process, to which we have previously referred, the starch settles more readily than the gluten and other impurities and, before any given portion of the flowing stream has traveled very far, the greater part of the starch will have settled upon the surface of the table and directly above the table will be a stratum of gluten and other impurities which have begun to settle and also some starch which is still mingled with the impurities. Assuming that the hopper has been empty, the material will flow into the hopper and fill it before it will overflow at the front end of the hopper. The contents of the hopper would now be in substantially the same state as that of the mixture as it enters upon the table except that most of the starch would have been removed therefrom if the settled starch were allowed to lie upon the table. However, the endless carriers are set in operation and the scrapers or paddles slowly move across the face of the table and carry before them the starch which has settled and finally push this starch into the hopper. As soon as the hopper has become filled the level of the fluid upon the table rises until there is an overflow at the front end of the hopper. Thereafter practically no gluten or other impurities enter the hopper as these substances will be carried with the current and overflow at the end of the hopper. The end of the pipe D preferably opens into the bottom of a receptacle K from the bottom of which leads a pipe L. This pipe is connected to a tank M for containing pure starch. There is also a branch $l$ which leads to the tank J. The outlet end of the pipe D is at such an elevation that when the overflow at the front end of the hopper begins the contents of the hopper also begin to flow through the pipe D and out of its upper end into the receptacle K. In starting under the conditions assumed, a valve $l'$ arranged in the pipe L is closed and a valve $l^2$ arranged in the pipe $l$ is opened. Therefore all of the material discharged into the receptacle K flows back to the tank J and not into the tank for containing pure starch. The apparatus need be in operation only a short time, however, before the original impure charge of the hopper has been entirely withdrawn and its place taken by a mass of pure watery starch which is gradually built up by the increments which are pushed into the top of the hopper by the paddles or scrapers. Therefore, the operator need only watch the color of the material discharged from the pipe D and when the color becomes pure white and the density is high enough the valve $l^2$ may be closed and the valve $l'$ opened. All of the material which thereafter flows out of the bottom of the hopper is then led directly to the reservoir for containing pure starch.

The starch as it settles upon the table does not immediately form into a hard mass but remains in a semi-liquid state so that by properly adjusting the rate of movement of the carriers no difficulty will be experienced in keeping the top of the table clean and preventing the formation of a hard layer of starch which must be removed manually. Furthermore the starch is finally delivered in such a manner that it may be conveyed through pipes to any desired point thereby not only avoiding the necessity of shoveling tough heavy masses of starch from the table, but also making the transportation of the starch simple and convenient.

We have found that by properly proportioning and adjusting the parts a mixture having a density of 5 degrees Baumé as it enters upon one end of a table approximately 20 feet long may be so modified that the density of the liquid which overflows the front end of the hopper will be in the neighborhood of 2 degrees Baumé while the density of the watery starch which is delivered from the bottom of the hopper may have a density of 15 degrees Baumé or more. If desired, the mixture which overflows at the front end of the hopper may be carried over another table where some of the starch which has been kept in suspension together with the gluten and other impurities will settle and the density of the mixture as it finally overflows at the end of the second table be reduced still more. The gluten and other impurities tend also to settle but not nearly so rapidly as the starch. In the usual process it is necessary for attendants to closely watch the tables and scrape from the surface of the settled starch any accumulation of gluten and other impurities which may take place. By making the tables which form part of the present apparatus fairly short, the impurities including the gluten may be carried entirely across the table before they have an opportunity to settle with the starch and the only impurities which remain in the starch which is discharged from the hopper comprise those small traces which it is practically impossible to remove by any process.

The pipe D is preferably made adjustable so that the head which serves to force the starch through this pipe may be nicely adjusted so as to secure the best results. A convenient arrangement consists in having at the upper end of the pipe D a small section of pipe $d$ which may be screwed into and out of the main pipe sufficiently to vary the level of the discharge outlet within any desired limits. Similarly, it is desirable to provide means for varying the level which the liquid upon a table must reach before it overflows at the front end of the hopper, better results being obtained in some cases with one depth of liquid upon the table while in other instances a different depth is advisable, depending upon the nature of the material which is being treated.

As hereinbefore stated, the gluten and other impurities, together with some of the starch, settle partially in the flowing stream so that there is a perceptible layer of impurities mixed with starch very close to the surface of the table. In order to prevent this impure mixture from being drawn into the hopper as it passes across the top thereof we prefer to provide an auxiliary outlet at the front end of the hopper in approximately the plane of the layer of impurities. This outlet may conveniently consist of a plurality of perforations $b'$ in the wall $b$ of the hopper, the perforations lying very near the plane of the top of the table. When the depth of the material upon the table is varied the depth to which the impurities sink varies also; and, if desired, the same means may be used for adjusting the height with respect to the table of both of the overflows at the front end of the hopper. This adjustment may conveniently be effected by making a portion of the wall $b$ as at $b^2$ detachable and supporting it in such a manner that it may be moved up and down within any desired limits. A simple form of support consists in providing one or more elongated slots $b^3$ in the member $b$ together with screws or bolts $b^4$ which pass through these slots into the stationary portion of the hopper. When it is desired to raise the level of the liquid upon the table the screws $b^4$ are loosened, the member $b^2$ is raised or lowered as the case may be, and the screws are again tightened so as to retain the member $b^2$ in its adjusted position. This particular adjustment may be effected in any other desired way however.

The water and impurities which overflow at the front end of the hopper may be received in a trough N which extends adjacent any desired number of tables or units and conducts the overflow to any desired point.

It will be seen that the scrapers or paddles remove the starch as fast as it settles and deposit it into the top of the hopper. The surface over which the mixture flows is therefore always kept smooth and even and there is little possibility of obstructing the flow of the partially settled layer of gluten and other impurities. When the hopper is reached the starch gradually moves downward over the inclined portion $a$ of the table so that there is no sudden change of current, and the watery mixture containing the impurities flows freely across the top of the hopper and is discharged at a point considerably in front of the main portion of the hopper. The cross-sectional area of the hoppers near the top thereof is made sufficiently great to prevent any disturbance or agitation due to the discharge through the comparatively small outlet C, there being only a gradual settling of the watery starch in the hopper and, because of the continued addition of settled starch there is actually very little apparent change in the upper portion of the hopper.

Since the starch has a tendency to settle and to cake upon the surfaces over which it passes, the discharge stream of pure starch should be made as large as possible in order to prevent any such settling. It is obvious that a larger discharge stream can be obtained by combining the discharge streams from a plurality of tables and for this reason it is preferable though not essential, that a single hopper be employed in connection with at least two of the tables.

After the valves $g'$, the overflow controlling devices $b^2$, and the pipes $d$ have once been carefully adjusted so as to make the conditions at the discharge ends of the tables such as to produce the best results for a given stream which is flowing upon the tables, no further attention need be given to the apparatus. Therefore any desired number of tables or groups of tables may be brought into operation or stopped by simply opening or closing a valve $h$ between the tank H and the header G. As long as the raw starch mixture is supplied at a uniform rate the starch will be separated and delivered in a watery state and may be transported to such points where it is desired to operate further upon the starch without requiring any handling or attention on the part of an operator; so that a single attendant may be placed in charge of sufficient apparatus to separate and recover the same amount of starch which heretofore has required a score or more of attendants.

In case it should be desired to drain all of the material from any table and its hopper, we have provided a header O which is connected to any desired number of hopper outlets, the communication between the outlets and the headers being controlled by valves $o$. This header may be connected to the pipe $l$ which leads to the reservoir J containing the raw material. When it is desired to drain any unit the proper valve $o$ is opened and the contents of the unit flow into the header and thence to the reservoir J.

It is not necessary, in starting the apparatus, to permit the hopper to become filled with the raw mixture, but a supply of pure starch may be provided so that the hopper may be filled therewith before the stream of raw starch is turned on. Any suitable arrangement may be provided for conveniently filling the hoppers, as for example, there may be an auxiliary reservoir P corresponding to the reservoir H, the reservoir P containing pure watery starch.

Q is a header similar to the header G and $q$, $q$ are pipes leading from the header Q to the hoppers of the tables with which the header is associated.

$p$ is a valve controlling the supply of starch from the reservoir to the header and $q'$ $q'$ are valves in the pipes $q$ $q$.

The reservoir P may obtain its supply in any suitable manner. Thus there may be a pipe $r$ leading into the top of this reservoir from the discharge side of the pump R which normally serves to pump the watery starch from the main reservoir M and force it into a pipe line $r'$. There may be valves $r^2$ and $r^3$ respectively in the pipe $r$ and in the pipe line $r'$ so that the pump may be made to supply only the tank P or the pipe line.

It is sometimes necessary to stop the separating operations at some of the tables for a short time, in which case it would not be economical to drain the tanks or permit the starch in the hoppers to remain quiet so as to permit settling and packing of the starch in the hoppers. When it is desired to thus temporarily shut down some of the tables, the header Q is placed in communication with the reservoir P and the valves q' in the proper pipes q are opened. Therefore pure starch flows through some of the pipes q into the hoppers with which they are associated and is discharged from the bottom of such hoppers through the pipe D and returns to the main reservoir. If the reservoir P is a small one or if the tables are to remain inactive for a considerable period, the pump R may be made to supply the auxiliary reservoir with starch as fast as it is taken out of the reservoir. Thus a natural circulation of pure starch may be maintained throughout the inactive hoppers and the hoppers and the pipes leading therefrom will be maintained clean so that all of the tables may again be placed in operation at a moment's notice.

The tables and hoppers are preferably made of metal so that they will retain their shapes and their inner surfaces will remain smooth under all conditions. Of course it is not necessary to make these parts of metal but we believe it would be preferable for the reason that wooden tables warp and become uneven, thereby interfering with the efficiency of the operation. The paddles or scrapers are also preferably formed so that their upper edges will lie below the surface of the moving stream, thereby permitting a natural flow of the main portion of the stream and avoiding the formation of eddy currents which might result in mixing impurities with the precipitated starch.

Where the partially exhausted mixture is passed over a second table or set of tables the same adjustments are made as at the first table or set of tables and thereafter no further attention need be given thereto since the supply of mixture will be steady and uniform. The entire separating and recovering process is therefore accomplished automatically and continuously and there need be no cessation in the operation in order to permit the removal of the starch. Furthermore all of the starch which is recovered is in pure form and there is no need for retabling a portion thereof as in the case of the old process where there is always an accumulation of impure starch at each end of the tables.

Having now fully described our invention, what we claim as new and desire to secure by Letters Patent is:—

1. The method of recovering pure starch from a watery mixture containing the same and impurities of less specific gravity, which consists in supplying said mixture so as to maintain a gently moving shallow layer which will permit the starch to settle, collecting the settled starch upon the top of a comparatively deep body of pure watery starch lying directly beneath said layer, withdrawing watery starch from a point adjacent to the bottom of said body at approximately the rate at which the starch settles, and withdrawing the exhausted water and the impurities remaining therein at a point above said body and at a rate which will maintain the thickness of said layer approximately constant, said mixture being supplied at such a rate that the starch may be withdrawn rapidly enough to prevent caking of the starch composing said body.

2. The method of recovering pure starch from a watery mixture containing the same and impurities of less specific gravity, which consists in supplying such mixture so as to maintain a gently-moving shallow layer which will permit the starch to settle, collecting the settled starch upon the top of a comparatively deep body of pure watery starch lying beneath said layer, withdrawing the watery starch from a point adjacent to the bottom of said body, and withdrawing the exhausted water and impurities remaining therein at a point above the top of said body.

3. The method of recovering in pure form starch contained in a watery mixture of the same containing impurities of less specific gravity, which consists in producing a shallow gently moving stream of said mixture so as to permit the starch to settle, collecting the starch as it settles by means independent of the stream and in such a manner as not to agitate the stream, and causing the collected starch and the remaining impure mixture to be divided into independent substreams branching respectively from the bottom and from the top of the main stream.

4. The method of recovering pure starch from a watery mixture containing the same and gluten, which consists in producing a slowly and gently moving shallow stream of said mixture so as to permit the starch to settle, causing said stream to flow over a comparatively deep body of watery starch, moving the settled starch positively and independently of the flow of the stream in the direction of flow of the stream until it is deposited upon said body, and withdrawing watery starch from the bottom of said body and gluten from a point above said body.

5. The method of recovering pure starch from a watery mixture containing the same and impurities of less specific gravity, which consists in producing a slowly and gently-moving shallow stream so as to permit the starch to settle, causing said stream to flow over a comparatively deep body of watery starch, moving the settled starch positively and independently of the flow of the stream until it reaches said body, withdrawing the watery starch from the bottom of said body and withdrawing said impurities and the exhausted water from a point above said body.

In testimony whereof, we sign this specification in the presence of two witnesses.

LOUIS P. BAUER.
THEODOR SPECK

Witnesses:
 RUBY V. NASH,
 WM. F. FREUDENSEICH.